(12) United States Patent
Ding et al.

(10) Patent No.: US 10,036,861 B1
(45) Date of Patent: Jul. 31, 2018

(54) CONNECTOR ASSEMBLIES FOR OPTOELECTRONIC MODULES

(71) Applicant: FINISAR CORPORATION, Sunnyvale, CA (US)

(72) Inventors: Frank Lei Ding, Milpitas, CA (US); Maziar Amirkiai, Sunnyvale, CA (US); Tao Wu, Union City, CA (US); Hongyu Deng, Saratoga, CA (US); Wendy Lau Pei Fen, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/611,478

(22) Filed: Jun. 1, 2017

(51) Int. Cl.
*G02B 6/42* (2006.01)
*G02B 6/43* (2006.01)

(52) U.S. Cl.
CPC .......... *G02B 6/4246* (2013.01); *G02B 6/421* (2013.01); *G02B 6/4256* (2013.01); *G02B 6/4284* (2013.01); *G02B 6/43* (2013.01)

(58) Field of Classification Search
CPC ...................................................... G02B 6/421
See application file for complete search history.

(56) References Cited

U.S. PATENT DOCUMENTS

| 3,948,582 A * | 4/1976 | Martin ................. | G02B 6/3874 250/227.24 |
| 4,892,379 A * | 1/1990 | Takeda ................. | G02B 6/3877 385/60 |
| 4,995,695 A * | 2/1991 | Pimpinella ........... | G02B 6/4202 385/49 |
| 2002/0176669 A1* | 11/2002 | Okamoto ............. | G02B 6/3833 385/80 |
| 2014/0270659 A1* | 9/2014 | Schunk ................ | G02B 6/4277 385/93 |

* cited by examiner

*Primary Examiner* — Omar R Rojas
(74) *Attorney, Agent, or Firm* — Maschoff Brennan

(57) ABSTRACT

In one embodiment, an optoelectronic assembly may include at least one transmitter or at least one receiver, a sleeve, a housing, a fiber stub, and a receptacle. The sleeve may define a sleeve opening sized and shaped to receive an optically transmissive portion of an optical fiber. The housing may define a housing cavity at least partially enclosing the transmitter or the receiver. The housing may include a lens port defining a lens port opening. The fiber stub may be positioned at least partially in the sleeve opening and the lens port opening. The receptacle may define a receptacle opening. The lens port, the sleeve and the fiber stub may be positioned at least partially in the receptacle opening.

19 Claims, 11 Drawing Sheets

CONNECTOR ASSEMBLIES FOR OPTOELECTRONIC MODULES

FIELD

The present disclosure generally relates to optoelectronic modules. In particular, some embodiments relate to connector assemblies for optically and mechanically coupling an optoelectronic module to an optical fiber.

BACKGROUND

Communication modules, such as optoelectronic modules, may include various components that engage in the transmission and/or reception of optical signals. Some of the components may be housed within a shell of the optoelectronic modules. Examples of such components may include a transmitter optical subassembly ("TOSA") and/or a receiver optical subassembly ("ROSA").

To engage in optical communication with other optoelectronic modules, an optoelectronic module may be optically and mechanically coupled with a connectorized optical fiber. The optoelectronic module may include connector assemblies configured to receive a connector of the optical fiber. Optical signals may be received and/or transmitted by the optoelectronic module via the optical fiber. Optical signals received by the optoelectronic module may be converted to electrical signals. Additionally or alternatively, the optoelectronic module may convert electrical signals to optical signals for transmission.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

The present disclosure generally relates to optoelectronic modules. In particular, some embodiments relate to connector assemblies for optically and mechanically coupling an optoelectronic module to an optical fiber.

In one non-limiting embodiment, an optoelectronic assembly may include at least one transmitter or at least one receiver, a sleeve, a housing, a fiber stub, and a receptacle. The sleeve may define a sleeve opening sized and shaped to receive an optically transmissive portion of an optical fiber. The housing may define a housing cavity at least partially enclosing the transmitter or the receiver. The housing may include a lens port defining a lens port opening. The fiber stub may be positioned at least partially in the sleeve opening and the lens port opening. The receptacle may define a receptacle opening. The lens port, the sleeve and the fiber stub may be positioned at least partially in the receptacle opening.

In another embodiment, a connector assembly for an optoelectronic assembly may include a fiber stub, a sleeve, a housing, and a receptacle. The fiber stub may include an optically transmissive medium. The sleeve may define a sleeve opening sized and shaped to receive the fiber stub and a corresponding optically transmissive portion of an optical fiber. The housing may define a housing cavity at least partially enclosing at least one transmitter or at least one receiver. The housing may include a lens port that may define a lens port opening sized and shaped to receive a portion of the fiber stub. The receptacle may define a receptacle opening sized and shaped to receive the lens port, the sleeve and the fiber stub. The fiber stub may be positioned at least partially in the lens port opening and the sleeve opening. The sleeve and the lens port may be positioned at least partially in the receptacle opening.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1A:
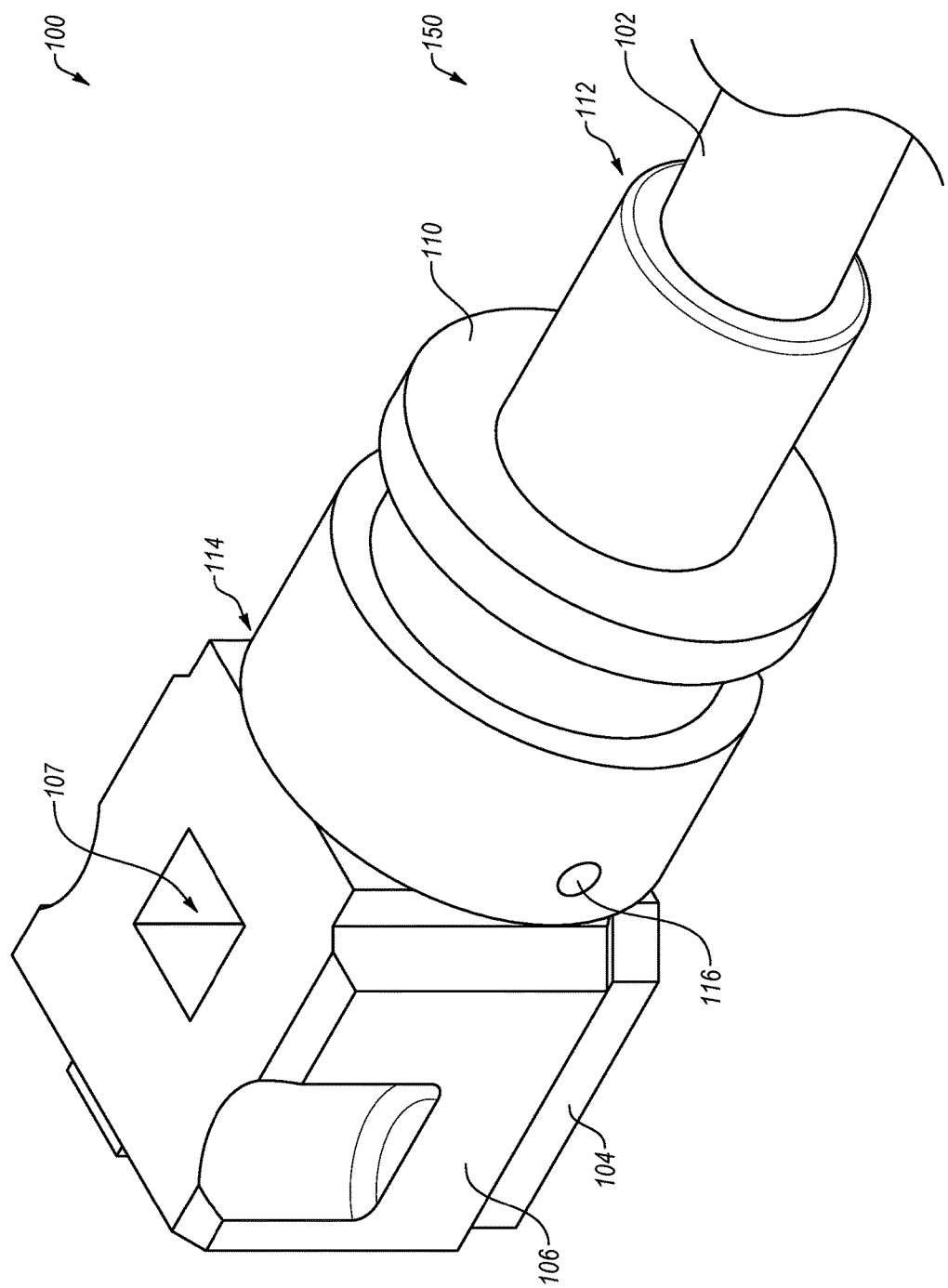
FIGS. 1A and 1B are perspective views of an example optoelectronic module.

Particular embodiments of the present disclosure will be described with reference to the accompanying drawings. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of configurations, all of which are explicitly contemplated herein.

The present disclosure generally relates to optoelectronic modules. In particular, some embodiments relate to connector assemblies for optically and mechanically coupling an optoelectronic module to an optical fiber.

For an optoelectronic module to be able to transmit or receive optical signals, it may be optically coupled with an optical fiber or other optically transmissive medium. In particular, the optical fiber may be optically coupled with optical components of the optoelectronic module that direct optical signals to transmitter or receiver components of the optoelectronic module. However, an optical connection that transmits optical signals between two optically transmissive media may cause loss or degradation of optical signals travelling therebetween. For example, loss or degradation may occur when optical signals travel from an optically transmissive portion of an optical fiber to optical components of an optoelectronic module, or vice versa.

One example of optical loss or degradation that may occur in an optical connection is optical return loss ("ORL" or "back reflection"). Optical return loss occurs when optical signals are reflected at the interface between two optically transmissive media. For example, optical return loss may occur if a portion of the optical signals travelling from an optical fiber are reflected at the interface with an optoelectronic module. In such circumstances, a portion of the optical signals do not reach receiver components of the optoelectronic module, and the optical signals are either degraded or lost entirely. In another example, optical return loss may occur if a portion of the optical signals travelling from an optoelectronic module are reflected at the interface with an optical fiber.

Although an optically transmissive medium is often a transparent or semi-transparent material (for example, a transparent core of an optical fiber, a lens, or a waveguide), optical signals may also travel through other optically transmissive medium such as air. Accordingly, if there is a space at the interface between two optical components, the optical signals travel through three optically transmissive media: the first optical component, the air, and then the second optical component. Optical return loss may occur at the interface of any of the three optically transmissive media.

To facilitate suitable operation of optoelectronic modules, connector assemblies may be designed to optically couple optical fibers and optoelectronic modules while reducing optical return loss. Reducing optical return loss may facilitate optical communication between two or more optoelectronic module via an optical fiber.

In some circumstances, different optoelectronic systems may be distinguished from one another based on the wavelength(s) used to transmit optical signals. In particular, optoelectronic systems that transmit optical signals using relatively longer wavelengths of light may be described as "long wavelength" optoelectronic systems and optoelectronic systems that transmit optical signals using relatively shorter wavelengths of light may be described as "short wavelength" optoelectronic systems. Optoelectronic systems may include components suitable for transmitting light of particular wavelengths. For example, long wavelength optoelectronic systems may include transmitters, receivers and optical fibers suited for transmitting long wavelength optical signals, and short wavelength optoelectronic systems may include transmitters, receivers and optical fibers suited for transmitting short wavelength optical signals.

Generally, long wavelength optoelectronic systems include optical fibers with smaller diameter cores and optical components with tighter tolerances when compared to short wavelength optoelectronic systems, which generally include optical fibers with larger diameter cores and optical components with greater tolerances. Long wavelength optoelectronic systems typically have the capability for higher bandwidth optical signal transmission over longer distances, but are more expensive because of tighter tolerances required for the components in the system. Since short wavelength optoelectronic systems generally include optical fibers with larger diameter cores, the optics used in such systems have a greater capability to gather light, and therefore may have greater tolerances. Accordingly, the components used in short wavelength optoelectronic systems may be less expensive to manufacture and implement when compared to long wavelength optoelectronic systems.

Optoelectronic systems may also be distinguished from one another based on the mode(s) of light that are used to transmit optical signals. In particular, optoelectronic systems that transmit optical signals using a single mode of light may be described as "single-mode" optoelectronic systems and optoelectronic systems that transmit optical signals using multiple modes of light may be described as "multi-mode" optoelectronic systems. Optoelectronic systems may include components suitable for transmitting single-mode or multi-mode optical signals. For example, single-mode optoelectronic systems may include transmitters, receivers and optical fibers suited for transmitting optical signals over a single mode, and multi-mode optoelectronic systems may include transmitters, receivers and optical fibers suited for transmitting optical signals over multiple modes of light.

Generally, single-mode optoelectronic systems include optical fibers with smaller diameter cores and optical components with tighter tolerances when compared to multi-mode optoelectronic systems, which generally include optical fibers with larger diameter cores and optical components with greater tolerances. Since single-mode optoelectronic systems use optical fibers with a small diameter core that allows only one mode of light to propagate, the number of light reflections created as the light passes through the core decreases, which in turn lowers attenuation and allows optical signals to travel further without being degraded. However, single-mode optoelectronic systems may generally require optics with tighter tolerances, and may therefore be more expensive.

Since multi-mode optoelectronic systems use optical fibers with larger cores that allow multiple modes of light to propagate therein, the number of light reflections created as the light passes through the core increases, creating the ability for more data to pass through at a given time. However, such optical fibers have a higher rate of dispersion and attenuation, and therefore the quality of optical signals is reduced over long distances. The components used in multi-mode optoelectronic systems may be less expensive to manufacture and implement when compared to single-mode optoelectronic systems because components with greater tolerances may be implemented.

Long wavelength optoelectronic systems typically correspond with single-mode optoelectronic systems and short wavelength optoelectronic systems typically correspond with multi-mode optoelectronic systems. However, in some applications other configurations may be implemented.

For single-mode optoelectronic systems, reducing optical return loss may facilitate obtaining suitable performance for single-mode optoelectronic modules. For multi-mode optoelectronic systems, reducing optical return loss may decrease background noise in optical fibers that connect multi-mode optoelectronic modules. Accordingly, connector assemblies with low optical return loss may be implemented in either single-mode or multi-mode optoelectronic systems. In some circumstances, connector assemblies with optical return loss of less than 26 decibels (dB) may facilitate suitable performance of some optoelectronic modules.

The present disclosure includes embodiments of connector assemblies for optically and mechanically coupling optoelectronic modules with optical fibers in a manner that reduces optical return loss. Additionally or alternatively, the embodiments described may result in optical connections with suitable tolerances for short wavelength optoelectronic systems and/or long wavelength optoelectronic systems. Embodiments employing the concepts of this disclosure may be relatively less expensive to manufacture than traditional connector assemblies with suitable tolerance and/or that reduce optical return loss. This may decrease the costs of manufacturing optoelectronic modules that include connector assemblies with suitable optical return loss characteristics. Additionally, the concepts of this disclosure may improve optical return loss characteristics of optoelectronic modules as compared to traditional optoelectronic modules. The concepts described herein may also provide various benefits including the ability to simplify manufacturing processes by simplifying assembly. Furthermore, the concepts described herein may be implemented without modifying the overall size and structure of existing products.

Although the embodiments are described in the context of optoelectronic modules used in the field of optical networking, it will be appreciated that aspects of this disclosure may be employed in other fields and/or operating environments where the functionality disclosed herein may be useful. Accordingly, the scope of this disclosure should not be construed to be limited to the example implementations and operating environments disclosed herein.

Figure 1B:
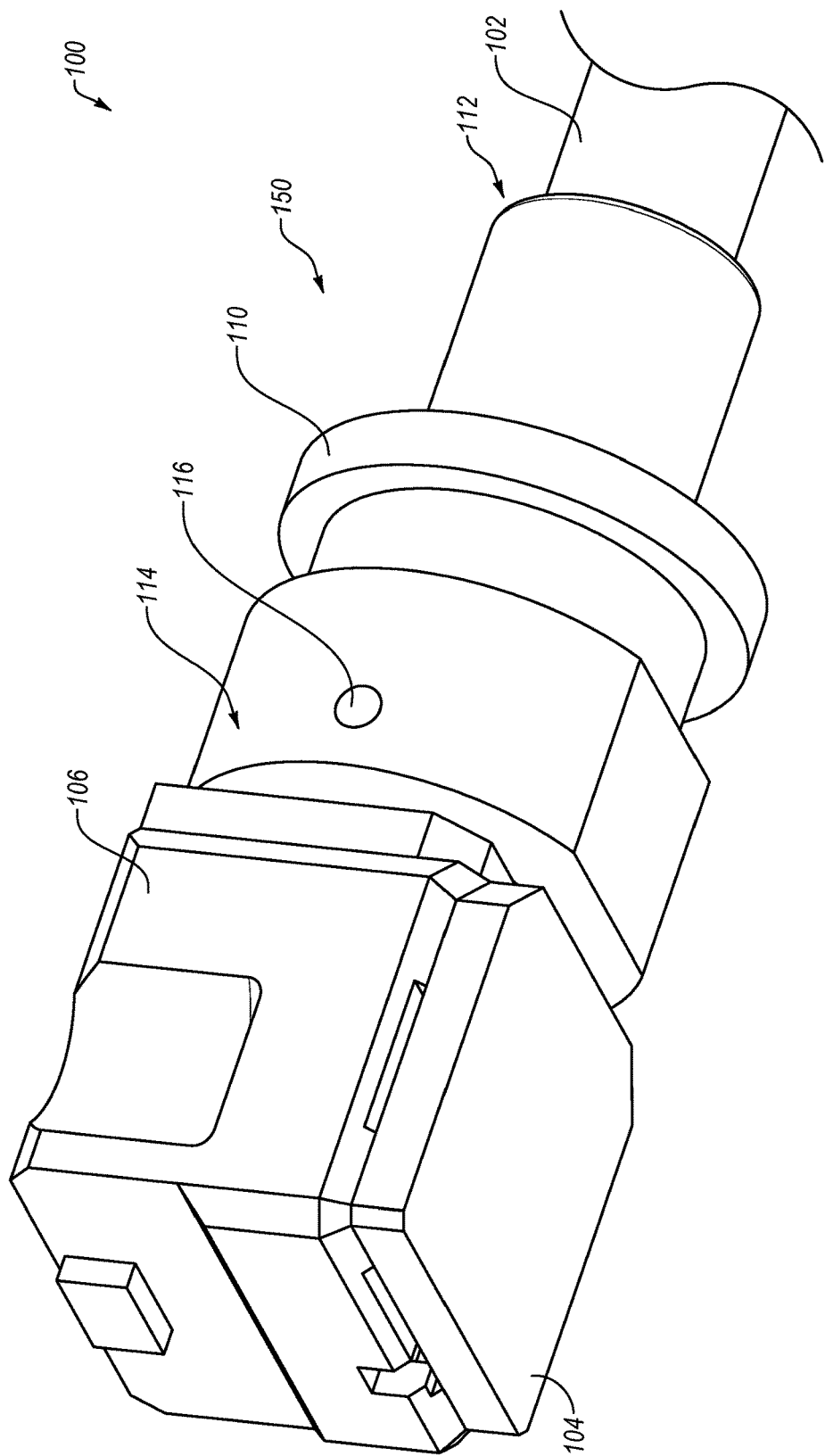

FIGS. 1A-1F illustrate views of an example embodiment of an optoelectronic module 100. FIG. 1A is a top perspective view of the optoelectronic module 100 and FIG. 1B is a bottom perspective view of the optoelectronic module 100. As illustrated, the optoelectronic module 100 may include a connector assembly 150 to optically and mechanically couple the optoelectronic module 100 to an optical fiber 102.

The optoelectronic module 100 may be configured as a transmitter optical subassembly ("TOSA") with one or more transmitter components such as a laser and/or as a receiver optical subassembly ("ROSA") with one or more receiver components. If the optoelectronic module 100 includes both transmitter and receiver components, it may be referred to as an optoelectronic transceiver.

The optoelectronic module 100 may include a base 104 and a housing 106 coupled to one another. The base 104 may be coupled to the bottom of the housing 106. The housing 106 may define a cavity 107 extending from the top of the housing 106 to the interior of the housing 106. In some configurations, the housing 106 may be formed at least partially or entirely of a plastic material. Although not illustrated, the optoelectronic module 100 may include a cover at least partially occluding the cavity 107. In some configurations, the cover may include an electromagnetic interference (EMI) attenuating material to absorb EMI generated by the optoelectronic module 100 or other components.

As will be described in further detail below, the housing 106 may at least partially enclose components positioned over the base 104, such as transmitter and/or receiver components. In some configurations, the transmitter and/or receiver components may include a short wavelength transmitter and/or receiver. The optical fiber 102 may transmit optical signals between the optoelectronic module 100 and other components, such as another optoelectronic module or other components that may be included in a fiber optic network. The optical fiber 102 includes an optically transmissive medium that transmits optical signals. For example, the optical fiber 102 may include one or more transparent or semi-transparent cores that permit optical signals to travel therein.

The optical fiber 102 may include an optical fiber connector at an end or termination of the optical fiber 102. The optical fiber connector may facilitate connecting the optical fiber 102 to the optoelectronic module 100. The optical fiber 102 connector may comply with one or more optical fiber connector standards such as SC, LC, FC, ST, MPO/MTP or any other suitable standard. The optical fiber connector standard may specify aspects of the optical fiber connector's design such as dimensions and securing mechanism employed to mechanically and/or optically couple the optical fiber 102 to a corresponding optoelectronic module.

As will be described in further detail below, the connector assembly 150 may be configured to mate with the optical fiber connector of the optical fiber 102. In particular, the connector assembly 150 may be sized and shaped to mate with optical fiber connectors complying with the standards described above. The connector assembly 150 may include features to couple with a securing mechanism of the optical fiber 102. Additionally or alternatively, the connector assembly 150 itself may be configured to comply with one or more connector standards such as ST, SC, LC, FC, ST, MPO/MTP or any other suitable standard.

The connector assembly 150 may include a receptacle 110 extending between and including a first end 112 and a second end 114. The first end 112 may be sized and shaped to receive the optical fiber 102. The second end 114 may be sized and shaped to mate with the housing 106. The second end 114 may define openings 116 extending into the interior of the receptacle 110, transverse to a longitudinal axis of the receptacle 110. The openings 116 may permit a material to be injected into the interior of the receptacle 110 to secure components positioned therein. For example, an adhesive such as an epoxy resin may be positioned into the receptacle 110 via the openings 116. The receptacle 110 may include any suitable number of the openings 116, and the openings 116 may be positioned on any portion of the receptacle 110 (e.g., proximate the first end 112).

In the illustrated configuration, the first end 112 is cylindrical and the second end 114 is partially cylindrical with a flat or planar portion. The first end 112 includes a diameter smaller than a corresponding diameter of the second end 114. A narrowed portion is positioned between the first end 112 and the second end 114. The receptacle 110 may include features for mechanically coupling with an optical fiber connector at or near the end of the optical fiber 102. Other suitable configurations of the receptacle 110 may be implemented to adapt to different requirements.

In some configurations, the receptacle 110 may be formed at least partially or entirely of a plastic material. Further, in some aspects the receptacle 110 may include a material to prevent light from passing through the material of the receptacle 110. Additionally or alternatively, the receptacle 110 may include a material that attenuates EMI generated by the optoelectronic module 100 and/or other components. For example, a metal filler may be included in the material of the receptacle 110 to prevent light from passing through the material of the receptacle 110 and/or to attenuate EMI. In other configurations, other filler or EMI attenuating materials may be implemented.

The receptacle 110 may be sized and shaped to mate with optical fiber connectors complying with one or more optical fiber connector standards such as SC, LC, FC, ST, MPO/MTP or any other suitable standard. The receptacle 110 may include features to couple with a securing mechanism of the optical fiber 102.

Figure 1C:
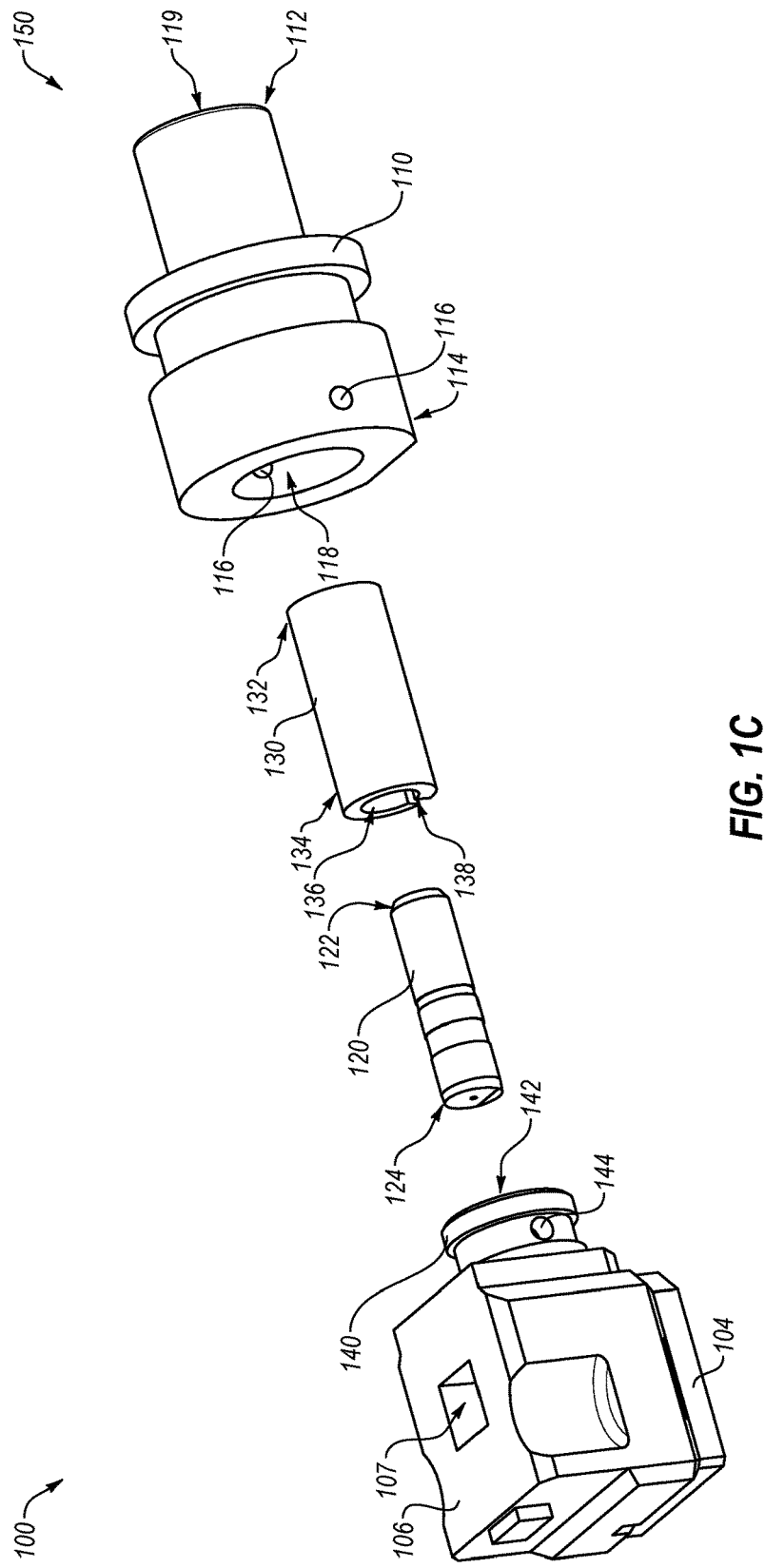
FIGS. 1C and 1D are exploded views of the optoelectronic module of FIGS. 1A-1B.
Figure 1D:
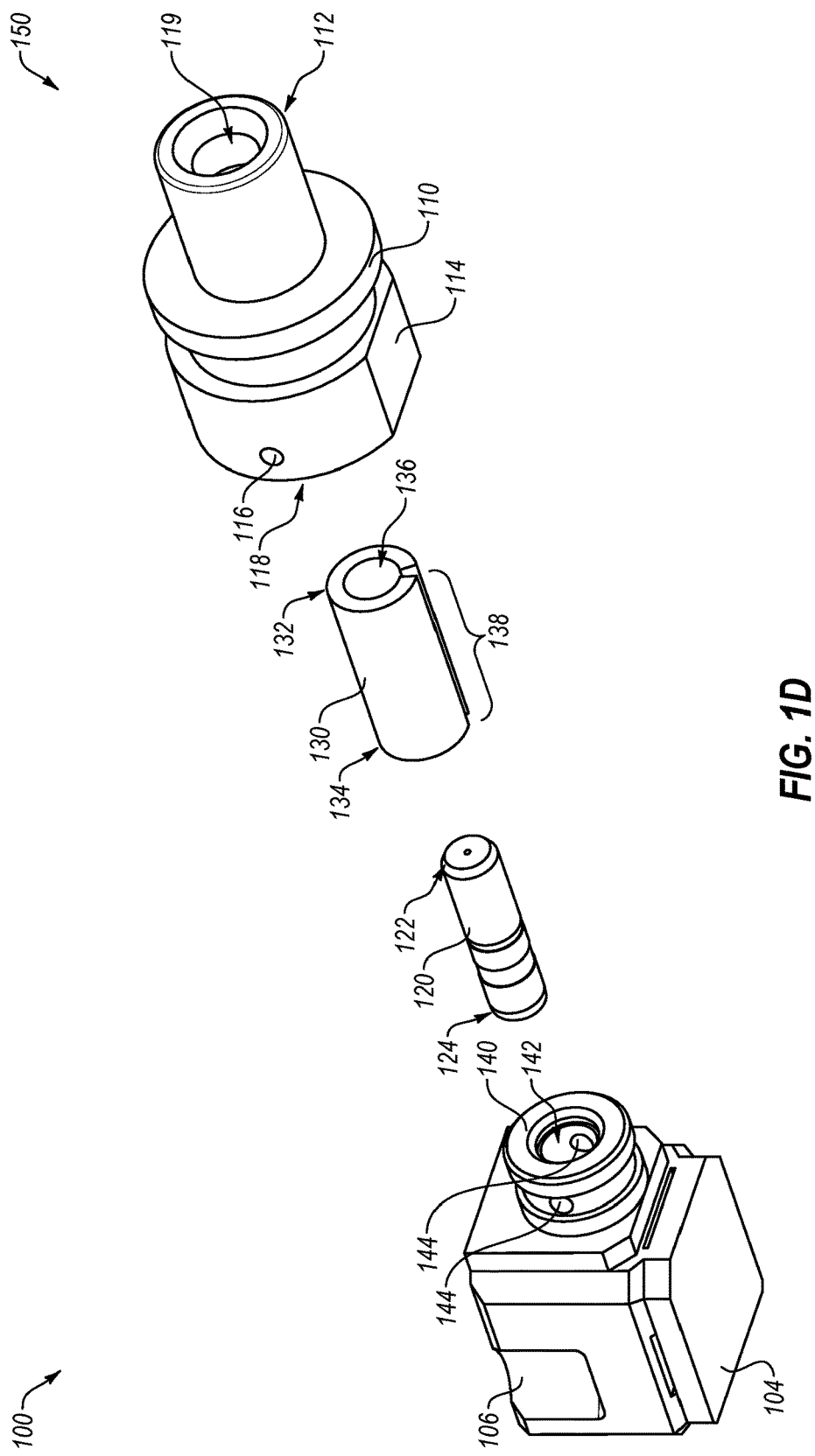

FIG. 1C is a top exploded view of the optoelectronic module 100 and FIG. 1D is a bottom exploded view of the optoelectronic module 100. As illustrated, the connector assembly 150 may include a fiber stub 120 and a sleeve 130 sized and shaped to be positioned inside of the housing 106 and the receptacle 110.

The fiber stub 120 may extend between and include a first end 122 and a second end 124. The first end 122 may be optically coupled with the optical fiber 102 and the second end 124 may be optically coupled with other components of the optoelectronic module 100, as will be described in further detail below. The fiber stub 120 may include an optically transmissive medium such as a fiber core to permit optical signals to travel between the optoelectronic module 100 and the optical fiber 102.

The fiber stub 120 may be positioned against the core of the optical fiber 102 to optically interface with the optical fiber 102. Alternatively, the fiber stub 120 may be positioned proximate the core of the optical fiber 102 to optically interface with the optical fiber 102. In some configurations, another optically transmissive medium may be positioned between the fiber stub 120 and the core of the optical fiber 102 to permit optical signals to travel therebetween. Although the illustrated embodiment includes the fiber stub 120, any suitable optically transmissive medium may be implemented in the optoelectronic module 100 instead or in addition to the fiber stub 120.

The diameter of the fiber stub 120 may be selected to correspond with a diameter of the core of the optical fiber 102. Additionally or alternatively, the optical configuration of the fiber stub 120 (e.g., single-mode, multi-mode, etc.) may be selected to correspond to the core of the optical fiber 102.

The sleeve 130 may be configured to at least partially surround the fiber stub 120 and a corresponding optically transmissive portion of the optical fiber 102 to mechanically and optically couple them to one another. The sleeve 130 may extend between and include a first end 132 and a second end 134 and may define an opening 136 sized and shaped to receive the fiber stub 120 and/or the core of the optical fiber 102. The opening 136 may extend between the first end 132 and the second end 134 and may include an inner diameter corresponding to an outer diameter of the fiber stub 120. In some configurations, the sleeve 130 may include a ceramic material.

The sleeve 130 may be formed partially or entirely of a resilient material and may define a slot 138 that extends between the first end 132 and the second end 134 to permit the sleeve 130 to deform and change an inner and/or an outer diameter of the sleeve 130. In particular, the resiliency of the sleeve 130 may permit the slot 138 to expand or contract, thereby changing certain dimensions of the sleeve 130 (e.g., inner and inner and/or an outer diameters). In some configurations, the sleeve 130 may include zirconium dioxide or other suitable materials.

In some circumstances, the slot 138 may increase the tolerance of the sleeve 130 by permitting the sleeve 130 to receive components that may include an outer diameter larger than the inner diameter of the sleeve 130. For example, the fiber stub 120 may include an outer diameter greater than the inner diameter of the sleeve 130, however, by virtue of the resilience of the sleeve 130 and the configuration of the slot 138, the sleeve 130 may expand to receive the fiber stub 120. The sleeve 130 may also expand to receive the core of the optical fiber 102 in a similar manner.

In circumstances where the sleeve 130 receives a component with a larger outer diameter than the inner diameter of the opening 136, the resilience of the sleeve 130 may create a radial urging force toward a central longitudinal axis of the sleeve 130. This radial force may facilitate retaining the components positioned inside of the opening 136 of the sleeve 130. For example, when the core of the optical fiber 102 and the fiber stub 120 are positioned in the opening 136, the radial force caused by the resilience of the sleeve 130 may retain the optical fiber 102 and the fiber stub 120 inside of the sleeve 130. Additionally or alternatively, the radial force may facilitate retaining the optical fiber 102 and the fiber stub 120 with respect to one another.

With continued reference to FIGS. 1C and 1D, the housing 106 may include a lens port 140 that may extend along an axis corresponding to the fiber stub 120, the sleeve 130, and/or the receptacle 110. The lens port 140 may define an opening 142 sized and shaped to receive a portion of the fiber stub 120. In particular, an inner diameter of the opening 142 may correspond to the outer diameter of the fiber stub 120. The lens port 140 may also be sized and shaped to interface with the receptacle 110. In particular, the second end 114 of the receptacle 110 may define a first opening 118 sized and shaped to receive the lens port 140. An inner diameter of the first openings 118 may correspond to an outer diameter of the lens port 140. The lens port 140 may be at least partially positioned inside of the receptacle 110 with the fiber stub 120 positioned at least partially therein. The first end 112 of the receptacle 110 may define a second opening 119 sized and shaped to receive the optical fiber 102. In particular, an inner diameter of the second opening 119 may correspond to an outer diameter of the core of the optical fiber 102.

The lens port 140 may define openings 144 extending into the interior of the lens port 140, transverse to a longitudinal axis of the lens port 140. The openings 144 may permit a material to be injected into the interior of the lens port 140 to secure components positioned therein. For example, an adhesive such as an epoxy resin may be positioned into the lens port 140 via the openings 144. The lens port 140 may include any suitable number of the openings 144, and the openings 144 may be positioned on any portion of the lens port.

In some configurations, a material may be injected into the openings 144 to secure the fiber stub 120 with respect to the lens port 140 before the receptacle 110 is positioned to surround the lens port 140. The lens port 140 may then be positioned to at least partially surround the lens port 140, and the material may then be injected into the openings 116 of the receptacle 110 to secure the receptacle 110 with respect to the lens port 140.

In other configurations, the openings 144 on the lens port 140 may be positioned to align with corresponding openings 116 of the receptacle 110 when the lens port 140 is positioned at least partially inside of the receptacle 110. Accordingly, the openings 144 and the openings 116 may permit a material to be injected into the interior of the receptacle 110 and the lens port 140 to secure components positioned therein. In some configurations, the openings 144 and the openings 116 may be fluidly connected such that the material may be injected into the openings 116 and may travel into the openings 144 into the interior of the lens port 140. In such configurations, injecting the material may secure the fiber stub 120 with respect to the lens port 140, and secure the lens port 140 with respect to the receptacle 110, as the fiber stub 120 is positioned at least partially inside of both the lens port 140 and the receptacle 110.

Figure 1E:
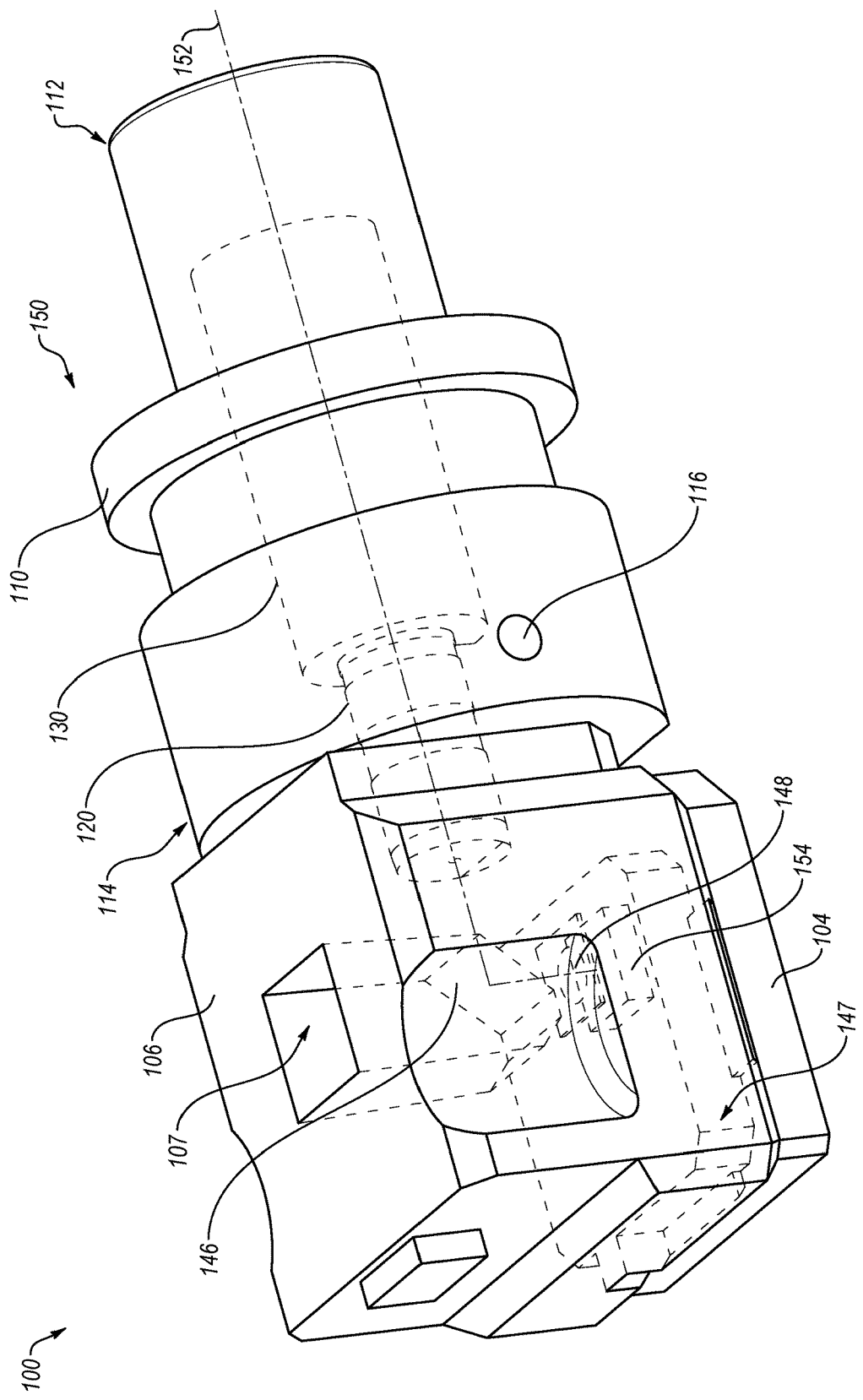
FIG. 1E is an alternative perspective view of the optoelectronic module of FIGS. 1A-1B.

FIG. 1E is a perspective view of the optoelectronic module 100 with certain interior components indicated in dashed lines. As illustrated in FIG. 1E, the fiber stub 120 and the sleeve 130 may be positioned at least partially inside of the receptacle 110. The sleeve 130 may at least partially surround the fiber stub 120. The housing 106 may define a second cavity 147 extending from the bottom of the housing 106 to the interior of the housing 106. In the illustrated configuration, the fiber stub 120, the sleeve 130, the receptacle 110, and the lens port 140 are arranged concentrically with respect to one another.

The cavity 147 may be at least partially occluded by the base 104. An optoelectronic component 154 may be positioned at least partially inside of the cavity 147. The optoelectronic component 154 may include an optical transmitter that receives electrical signals and outputs optical signals and/or an optical receiver that receives optical signals and outputs electrical signals. The optoelectronic component 154 may also include any suitable components to modulate electrical and/or optical signals. In some configurations, a substrate may be positioned at least partially inside of the cavity 147 and the optoelectronic component 154 may be positioned on the substrate. For example, the substrate may be a flexible or rigid printed circuit board (PCB) or other suitable substrate.

The fiber stub 120 may transmit an optical signal 152 between the optoelectronic component 154 and the optical fiber 102 (see FIGS. 1A-1B). The housing 106 may include a surface 146, which may be at least partially reflective. The housing 106 may be transparent proximate the surface 146 to permit light to pass through the housing 106 between the optoelectronic component 154, the surface 146 and the fiber stub 120. As illustrated, the surface 146 may reflect the optical signal 152 to direct the optical signal 152 from the fiber stub 120 to the optoelectronic component 154, or vice versa. In the illustrated configuration, the surface 146 is positioned adjacent to the cavity 107 and defines a portion of the cavity 107, however, however other configurations may be implemented. As illustrated, the surface 146 may be positioned at substantially a 45 degree angle with respect to the optical signal 152 travelling from the optoelectronic component 154 and/or the fiber stub 120.

The housing 106 may define an optical component 148 configured to convey, direct, collimate and/or focus the optical signal 152 travelling therethrough. In the illustrated configuration, the optical component 148 includes a lens positioned inside of the cavity 147. As shown, the optical component 148 is optically coupled between the optoelectronic component 154 and the surface 146. The optical component 148 may focus light travelling to and/or from the optoelectronic component 154.

Figure 1F:
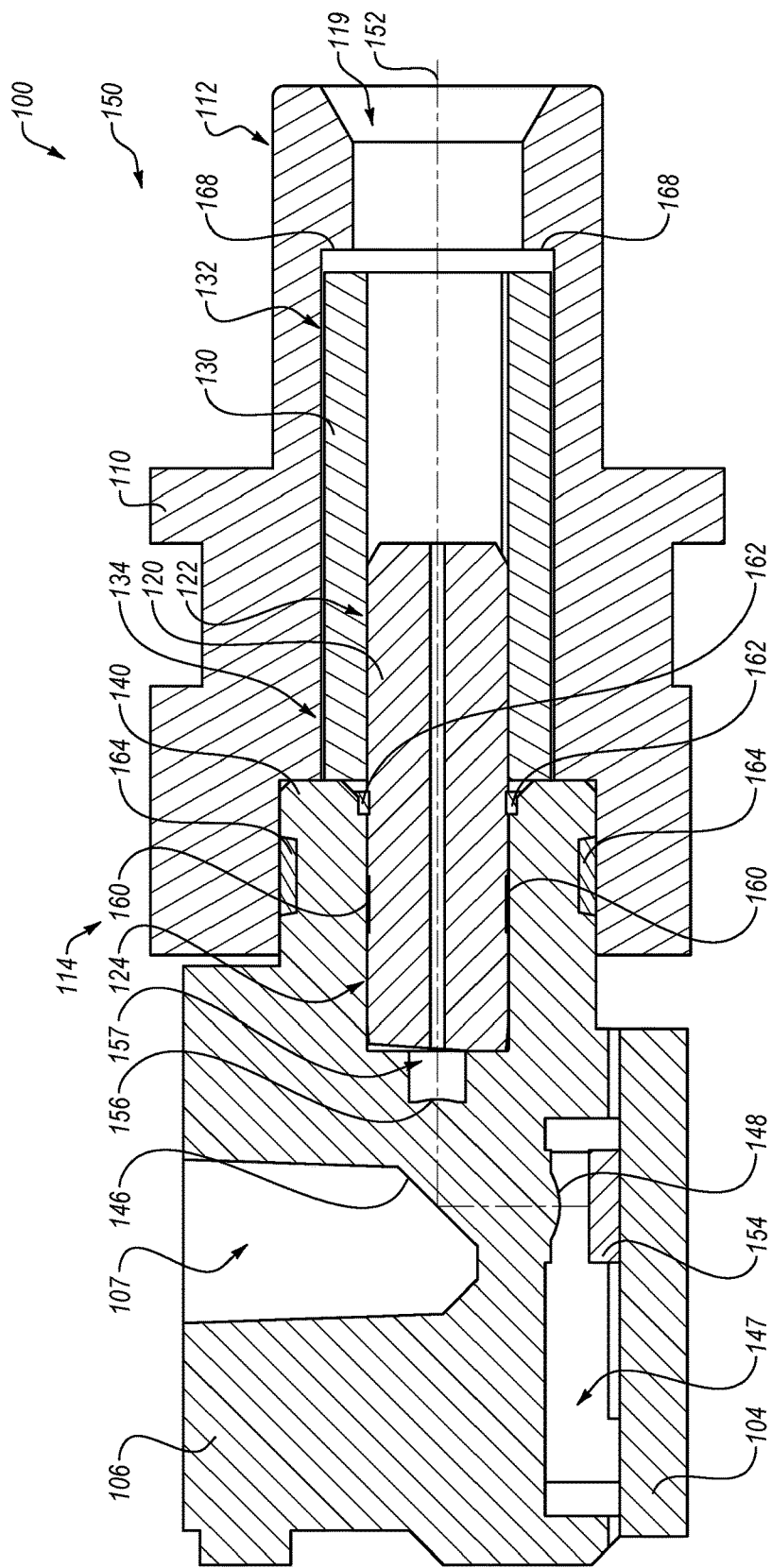
FIG. 1F is a section view of the optoelectronic module of FIGS. 1A-1B.

FIG. 1F is a section view of the optoelectronic module 100 further illustrating interior aspects of the optoelectronic module 100. The housing 106 may define a third cavity 157 extending along a longitudinal axis of the lens port 140. As shown, the fiber stub 120 may be positioned against the housing 106 at the cavity 157 such that the optical signal 152 may travel between the fiber stub 120, the surface 146 and the optoelectronic component 154. The housing 106 may define an optical component 156 configured to convey, direct, collimate and/or focus the optical signal 152 travelling therethrough. In the illustrated configuration, the optical component 156 includes a lens positioned inside of the cavity 157. As shown, the optical component 156 is optically coupled between the fiber stub 120 and the surface 146. The optical component 156 may focus light travelling to and/or from the fiber stub 120.

In some configurations, the optical signal 152 may travel from the optical fiber 102 (see FIGS. 1A-1B), through the fiber stub 120 and the optical component 156 to the surface 146. The optical signal 152 may then be reflected by the surface 146, travel through the optical component 148, and may be received by the optoelectronic component 154. Additionally or alternatively, the optical signal 152 may be generated at the optoelectronic component 154, and may then travel through the optical component 148 to the surface 146. The optical signal 152 may then be reflected by the surface 146, travel through the optical component 156 and the fiber stub 120 to the optical fiber 102 (see FIGS. 1A-1B).

In some circumstances, the surface of the fiber stub 120 may be smooth, and may be modified to increase the roughness of the surface to enhance bonding between the fiber stub 120 and other components such as the housing 106 and/or the sleeve 130. The surface of the fiber stub 120 may be machined to create cuts or other imperfections to increase the roughness on the surface to facilitate bonding, for example, using epoxy or other adhesives. This is turn may improve the strength of the optoelectronic module 100 once assembly is complete.

An example of such configurations is illustrated in FIG. 1F, which shows a channel 160 positioned on the surface of the fiber stub 120. The channel 160 may extend around the circumference of the fiber stub 120 to facilitate bonding. In some configurations, the channel 160 may be formed by machining. The channel 160 may permit a material, such as an epoxy, to be positioned between the lens port 140 and the fiber stub 120 to couple them to one another.

A second channel 162 may be defined between the fiber stub 120 and the lens port 140. In some configurations, the channel 162 may facilitate positioning the fiber stub 120 to optically align the fiber stub 120 with other components, such as the optical fiber 102 and/or the optical components of the housing 106. In particular, the channel 162 may permit the fiber stub 120 to be positioned in the lens port 140 to facilitate optical alignment. Additionally or alternatively, the second channel 162 may facilitate coupling the fiber stub 120 and the lens port 140 to one another. In some configurations, the channel 162 may be formed by machining. As illustrated, the channel 162 includes a flared configuration that permits the fiber stub 120 to be adjusted in the lens port 140. Once the fiber stub 120 is optically aligned, the channel 162 may be filled with a material, such as an epoxy, to facilitate coupling the lens port 140 and the fiber stub 120 to one another.

As shown, a third channel 164 may be defined in the lens port 140 of the housing 106, and may permit a material, such as an epoxy, to be positioned between the lens port 140 and the receptacle 110 to couple them to one another. The channel 160 may extend around the circumference of the lens port 140. In other configurations, the channel 164 may be defined in the receptacle 110 and/or may be positioned at other positions in the optoelectronic module 100. In some configurations, the channel 164 may be molded, for example, when the housing 106 is formed.

In some configurations, the material positioned into the channels 160, 162, and/or 164 may be different from one another. For example, the material injected into the channel 164 (for example, via the outer openings 116) may include more filler than the material injected the channel 160 (for example, via the inner openings 144), or vice versa. Additionally or alternatively, the material injected into the channel 164 may include more filler and/or a different type of filler than the material injected the channel 162, or vice versa. A filler may be used to change the viscosity and/or strength of the material to achieve desired bonding characteristics to bond the receptacle 110, the housing 106, and/or the fiber stub 120 to one another.

With continued reference to FIGS. 1A-1F, example aspects of assembling and manufacturing the optoelectronic module 100 will be discussed. As mentioned above, in some configurations the housing 106 and the receptacle 110 may be formed of plastic. The housing 106 and/or the receptacle 110 may be formed by any suitable process, such as plastic molding or injection molding.

During assembly of the optoelectronic module 100, the fiber stub 120 may be positioned opening 142 of the housing 106. In some configurations, the fiber stub 120 may be positioned to the end of the opening 142 such that the second end 124 of the fiber stub 120 at least partially abuts the housing 106 (see, for example, FIG. 1F). The fiber stub 120 and the housing 106 may be secured to one another. For example, an adhesive such as an epoxy may be injected into the openings 144 to secure the fiber stub 120 and the housing 106 with respect to one another. Additionally or alternatively, an adhesive such as an epoxy may be positioned into the second channel 162 to secure the fiber stub 120 to the housing 106 with respect to one another. In other configurations, the fiber stub 120 and the housing 106 may be coupled to one another by laser welding or ultrasonic welding.

The first end 122 of the fiber stub 120 may be positioned inside of the opening 136 of the sleeve 130. The sleeve 130 may be positioned around the first end 122 of the fiber stub 120. As illustrated in FIG. 1F, the sleeve 130 may be positioned to abut the lens port 140 of the housing 106. Accordingly, the sleeve 130 and the housing 106 may partially or fully surround the fiber stub 120 positioned therein.

The housing 106, the fiber stub 120, and the sleeve 130 may be positioned at least partially inside of the opening 118 of the receptacle 110. As illustrated in FIG. 1F, the first opening 118 may include a diameter larger than a corresponding diameter of the second opening 119. The receptacle 110 may include a narrowed portion 168 between the first opening 118 and the second opening 119. The first opening 118 may be sized and shaped to receive the sleeve 130, and the narrowed portion 168 may prevent the sleeve 130 from being inserted further into the receptacle 110. In some configurations, the sleeve 130 may be positioned inside of the receptacle 110 and may be retained in the opening 118 between the receptacle 110 and the fiber stub 120. In such configurations, securing the sleeve 130 to the fiber stub 120 and/or the receptacle 110 via an adhesive may not be necessary. Further, in such configurations, the relative position of the receptacle 110, the sleeve 130, the fiber stub 120 and/or the housing 106 may be adjusted to suitably align the components of the optoelectronic module 100. In other configurations, the sleeve 130, the fiber stub 120 and/or the receptacle 110 may be secured to one another via an adhesive such as an epoxy, or by laser welding or ultrasonic welding.

Once the components are aligned with respect to one another, the receptacle 110 may be secured to the housing 106. For example, an adhesive such as an epoxy may be injected into the openings 116 to secure the receptacle 110 and the housing 106 with respect to one another. In other configurations, the receptacle 110 and the housing 106 may be coupled to one another by laser welding or ultrasonic welding.

In some aspects, once the housing 106, the receptacle 110, the fiber stub 120, and the sleeve 130 are secured to one another, assembly of the optoelectronic module 100 may be complete, and the connector assembly 150 may be coupled to the optical fiber 102. For example, the optical fiber 102 may be positioned at least partially inside of the opening 119 to be optically coupled with the fiber stub 120. Additionally or alternatively, the optical fiber 102 may be positioned at least partially inside of the opening 119 to be mechanically coupled with the receptacle 110 and/or the sleeve 130. In some configurations, the sleeve 130 may facilitate optically and mechanically aligning the fiber stub 120 with the optical fiber 102. In particular, the sleeve 130 may be sized and shaped to optically and mechanically align the fiber stub 120 and the optical fiber 102 when both are at least partially positioned inside of the fiber stub 120.

FIGS. 2A-2F illustrate views of another example embodiment of an optoelectronic module 200. The optoelectronic module 200 may include any suitable aspects described with respect to the optoelectronic module 100, and similar numbering may be used to describe similar components, as will be evident from context. Whereas the optoelectronic module 100 may be described as a "horizontal" optoelectronic assembly by virtue of the positioning of the optical components, the optoelectronic module 200 may be described as a "vertical" optoelectronic assembly by virtue of the positioning of its optical components, as will be described in further detail below.

Figure 2A:
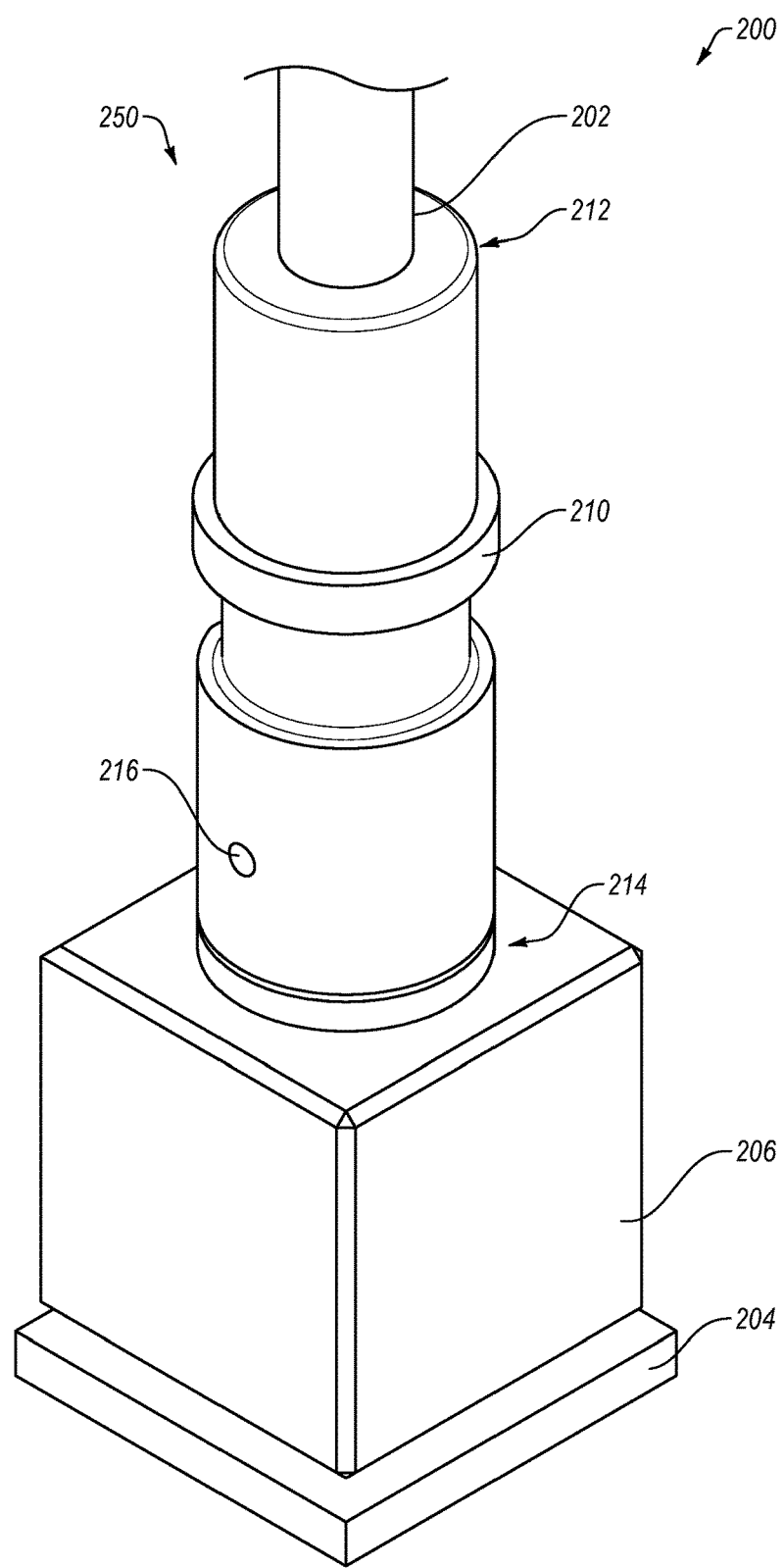
FIG. 2A is a perspective views of another example optoelectronic module.

FIG. 2A is a top perspective view of the optoelectronic module 200. As illustrated, the optoelectronic module 200 may include a connector assembly 250 to optically and mechanically couple the optoelectronic module 200 to an optical fiber 202.

The optoelectronic module 200 may include a base 204 and a housing 206 coupled to one another. The base 204 may be coupled to the bottom of the housing 206. The housing 206 may at least partially enclose components positioned over the base 204, such as transmitter and/or receiver components. Based on the vertical orientation of the optoelectronic module 200, the bottom of the housing 206 may be positioning differently than the bottom of the housing 206. In particular, as shown, the bottom of the housing 206 is aligned with a longitudinal axis of the housing 206 and the optical fiber 202. In contrast, in the horizontal configuration of the optoelectronic module 100 the bottom of the housing 106 does not intersect the longitudinal axis of the housing 106 or the optical fiber 102. Nevertheless, other configurations for the optoelectronic modules 100, 200 may be implemented.

The connector assembly 250 may be configured to mate with the optical fiber connector of the optical fiber 202. The connector assembly 250 may include a receptacle 210 extending between and including a first end 212 and a second end 214. The first end 212 may be sized and shaped to receive the optical fiber 202. The second end 214 may be sized and shaped to mate with the housing 206. The second end 214 may define openings 216 extending into the interior of the receptacle 210, transverse to a longitudinal axis of the receptacle 210. The openings 216 may permit a material to be injected into the interior of the receptacle 210 to secure components positioned therein. For example, an adhesive such as an epoxy resin may be positioned into the receptacle 210 via the openings 216. The receptacle 210 may include any suitable number of the openings 216, and the openings 216 may be positioned on any portion of the receptacle 210 (e.g., proximate the first end 212).

FIG. 2A is a top exploded view of the optoelectronic module 200. As illustrated, the connector assembly 250 may include a fiber stub 220 and a sleeve 230 sized and shaped to be positioned inside of the housing 206 and the receptacle 210.

The fiber stub 220 may extend between and include a first end 222 and a second end 224. The first end 222 may be optically coupled with the optical fiber 202 and the second end 224 may be optically coupled with other components of the optoelectronic module 200, as will be described in further detail below. The fiber stub 220 may be formed of an optically transmissive medium such as a fiber core to permit optical signals to travel between the optoelectronic module 200 and the optical fiber 202.

The fiber stub 220 may be positioned against the core of the optical fiber 202 to optically interface with the optical fiber 202. The diameter of the fiber stub 220 may be selected to correspond with a diameter of the core of the optical fiber 202. Additionally or alternatively, the optical configuration of the fiber stub 220 (e.g., single-mode, multi-mode, etc.) may be selected to correspond to the core of the optical fiber 202.

A support member 223 may be positioned to at least partially surround the fiber stub 220. The support member 223 may facilitate positioning and/or aligning the fiber stub 220 with the optical fiber 202 and/or the optical components of the optoelectronic module 200. In the illustrated configuration, the support member 223 is a ring partially enclosing the fiber stub 220. In some configurations, the ring may include or be formed of a metal or metallic material.

The sleeve 230 may be configured to at least partially surround the fiber stub 220 and a corresponding optically transmissive portion of the optical fiber 202 to mechanically and optically couple them to one another. The sleeve 230 may extend between and include a first end 232 and a second end 234 and may define an opening 236 sized and shaped to receive the fiber stub 220 and/or the core of the optical fiber 202. The opening 236 may extend between the first end 232 and the second end 234 and may include an inner diameter corresponding to an outer diameter of the fiber stub 220. In some configurations, the sleeve 230 may include a ceramic material.

The sleeve 230 may be formed of a resilient material and may define a slot 238 that extends between the first end 232 and the second end 234 to permit the sleeve 230 to deform and change an inner and/or an outer diameter of the sleeve 230. In particular, the resiliency of the sleeve 230 may permit the slot 238 to expand or contract, thereby changing certain dimensions of the sleeve 230 (e.g., inner and inner and/or an outer diameters). In some configurations, the sleeve 230 may include zirconium dioxide or other suitable materials.

Figure 2B:
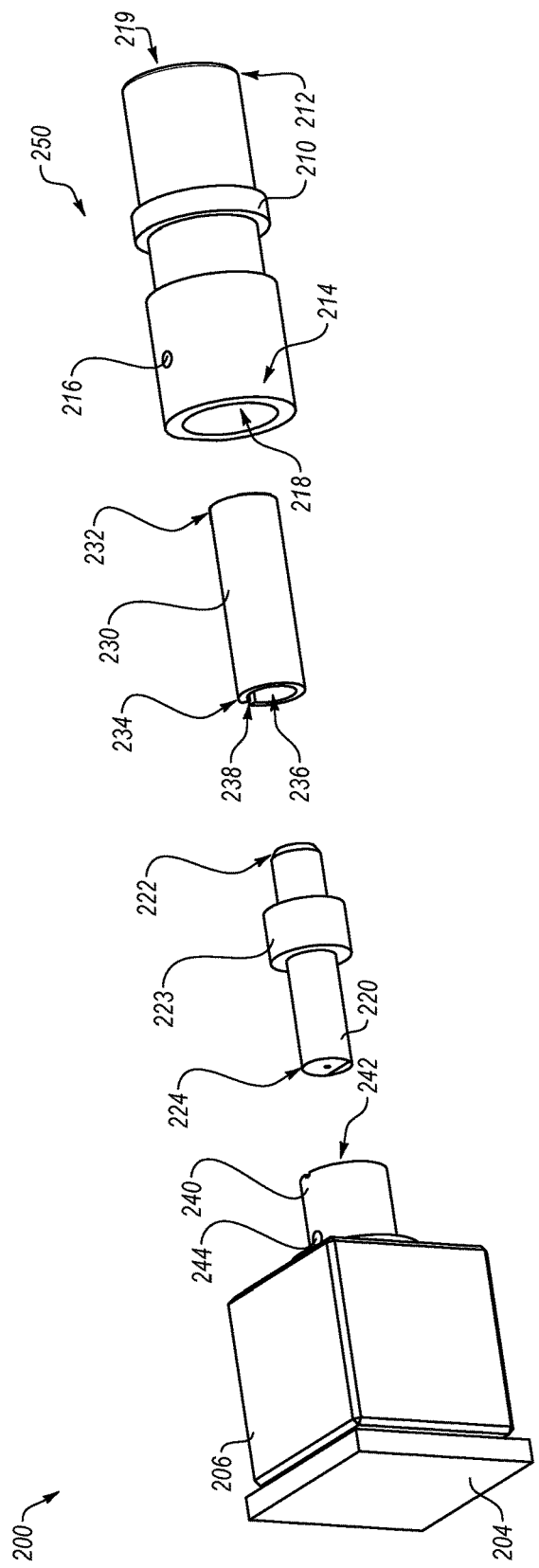
FIG. 2B is an exploded view of the optoelectronic module of FIG. 2A.

With continued reference to FIG. 2B, the housing 206 may include a lens port 240 that may extend along an axis corresponding to the fiber stub 220, the sleeve 230, and/or the receptacle 210. The lens port 240 may define an opening 242 sized and shaped to receive a portion of the fiber stub 120 and/or the support member 223. In particular, an inner diameter of the opening 242 may correspond to the outer diameter of the fiber stub 220 and/or the support member 223. The lens port 240 may also be sized and shaped to interface with the receptacle 210. In particular, the second end 214 of the receptacle 210 may define a first opening 218 sized and shaped to receive the lens port 240. An inner diameter of the first openings 218 may correspond to an outer diameter of the lens port 240. The lens port 240 may be at least partially positioned inside of the receptacle 210 with the fiber stub 220 positioned at least partially therein. The first end 212 of the receptacle 210 may define a second opening 219 sized and shaped to receive the optical fiber 202. In particular, an inner diameter of the second opening 219 may correspond to an outer diameter of the core of the optical fiber 202.

The lens port 240 may define openings 244 extending into the interior of the lens port 240, transverse to a longitudinal axis of the lens port 240. The openings 244 may permit a material to be injected into the interior of the lens port 240 to secure components positioned therein. For example, an adhesive such as an epoxy resin may be positioned into the lens port 240 via the openings 244. The lens port 240 may include any suitable number of the openings 244, and the openings 244 may be positioned on any portion of the lens port.

In some configurations, a material may be injected into the openings 244 to secure the fiber stub 220 with respect to the lens port 240 before the receptacle 210 is positioned to surround the lens port 240. The lens port 240 may then be positioned to at least partially surround the lens port 240, and the material may then be injected into the openings 216 of the receptacle 210 to secure the receptacle 1210 with respect to the lens port 240.

Figure 2C:
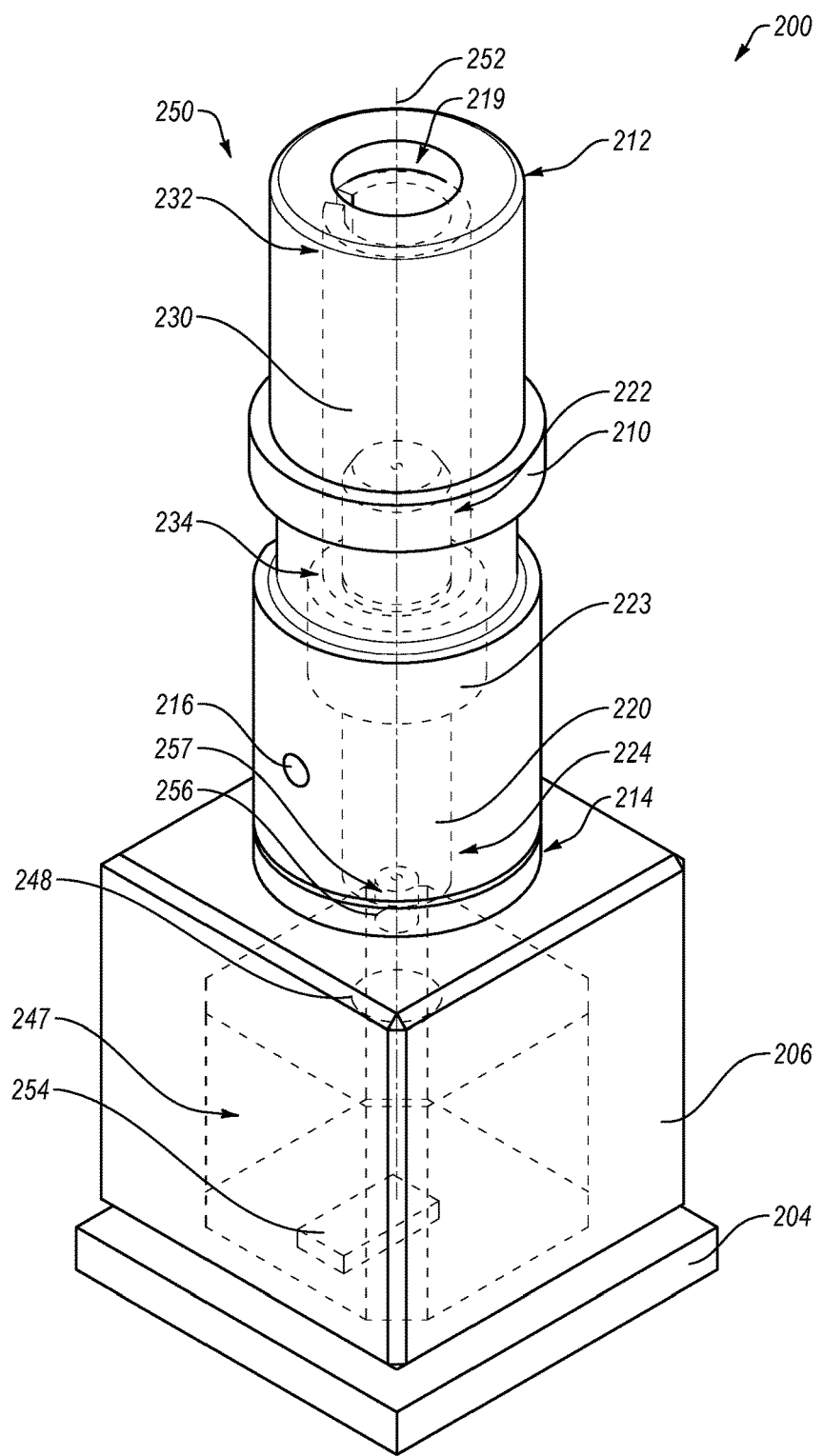
FIG. 2C is an alternative perspective view of the optoelectronic module of FIG. 2A.

FIG. 2C is a perspective view of the optoelectronic module 200 with certain interior components indicated in dashed lines. As illustrated in FIG. 2C, the fiber stub 220, the support member 223, and the sleeve 230 may be positioned at least partially inside of the receptacle 210. The sleeve 230 may at least partially surround the fiber stub 220. The housing 206 may define a cavity 247 extending from the bottom of the housing 206 to the interior of the housing 206. The cavity 247 may be at least partially occluded by the base 204. An optoelectronic component 254 may be positioned at least partially inside of the cavity 247. The optoelectronic component 254 may include an optical transmitter that receives electrical signals and outputs optical signals and/or an optical receiver that receives optical signals and outputs electrical signals. The optoelectronic component 254 may also include any suitable components to modulate electrical and/or optical signals. In some configurations, a substrate may be positioned at least partially inside of the cavity 247 and the optoelectronic component 254 may be positioned on the substrate. For example, the substrate may be a flexible or rigid printed circuit board (PCB) or other suitable substrate.

The fiber stub 220 may transmit an optical signal 252 between the optoelectronic component 254 and the optical fiber 202 (see FIG. 2A). The housing 206 may be at least partially transparent to permit light to pass through the housing 206 between the optoelectronic component 254 and the fiber stub 220. The housing 206 may define an optical component 248 configured to convey, direct, collimate and/or focus the optical signal 252 travelling therethrough. In the illustrated configuration, the optical component 248 includes a lens positioned inside of the cavity 247. As shown, the optical component 248 is optically coupled between the optoelectronic component 254 and the fiber stub 220. The optical component 248 may focus light travelling to and/or from the optoelectronic component 254.

Figure 2D:
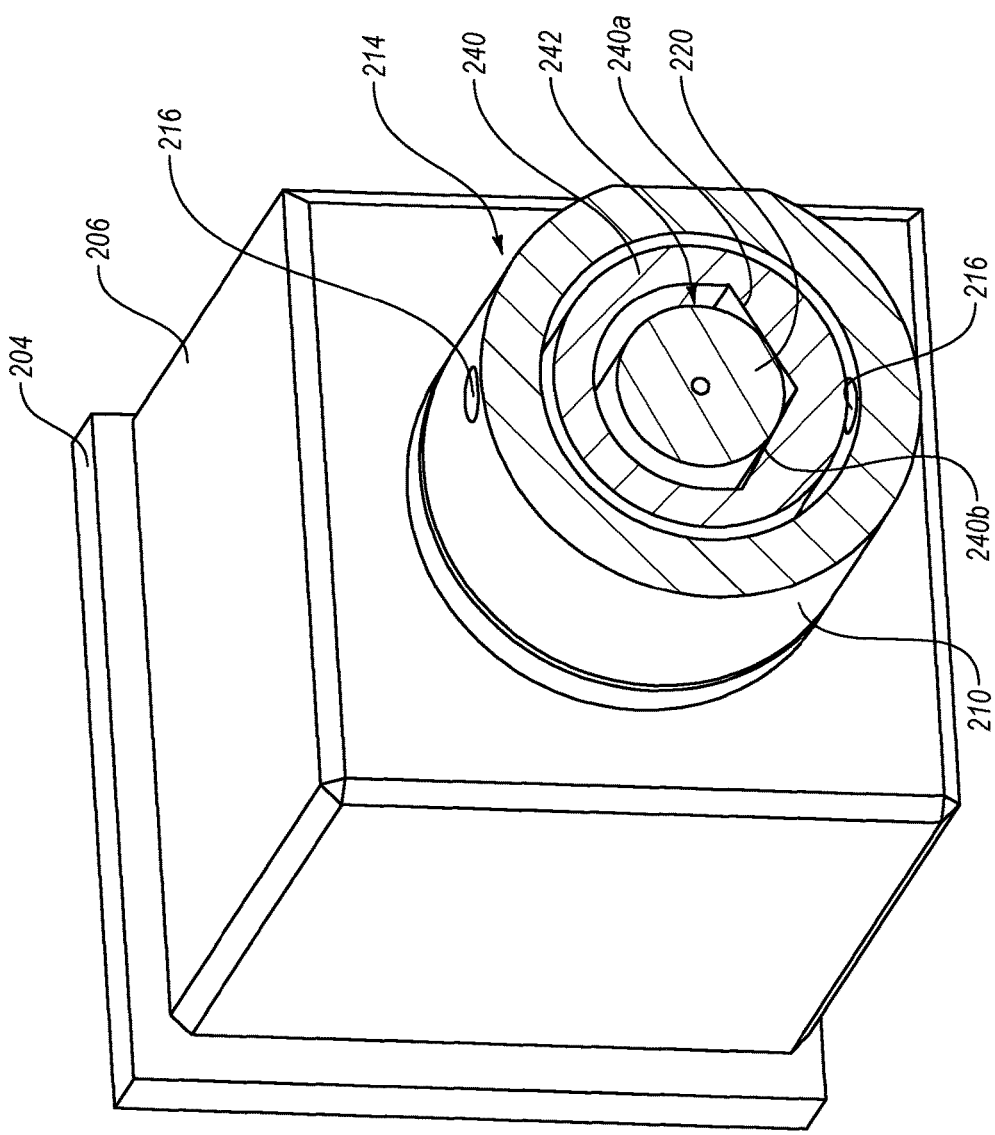
FIG. 2D is a section view of the optoelectronic module of FIG. 2A.

FIG. 2D is a section view of the optoelectronic module 200 further illustrating interior aspects of the optoelectronic module 200. As illustrated the lens port 240 may include a first surface 290a and a second surface 290b defining the opening 242. In the illustrated configuration, the first surface 290a and the second surface 290b are arranged at a 120 degree angle with respect to one another, although other configurations may be implemented. The first and second surfaces 290a-b may support the fiber stub 220 as it is being positioned in the lens port 240. In particular, the first and second surfaces 290a-b may support the fiber stub 220 as it is being optically and mechanically aligned with other components of the optoelectronic module 200. Additionally or alternatively, the first and second surfaces 290a-b may facilitate in centering the fiber stub 220 in the lens port 240. For example, the first and second surfaces 290a-b may be positioned in a manner such that the fiber stub 220 is suitably centered when it is positioned at least partially inside the lens port 240.

Figure 2E:
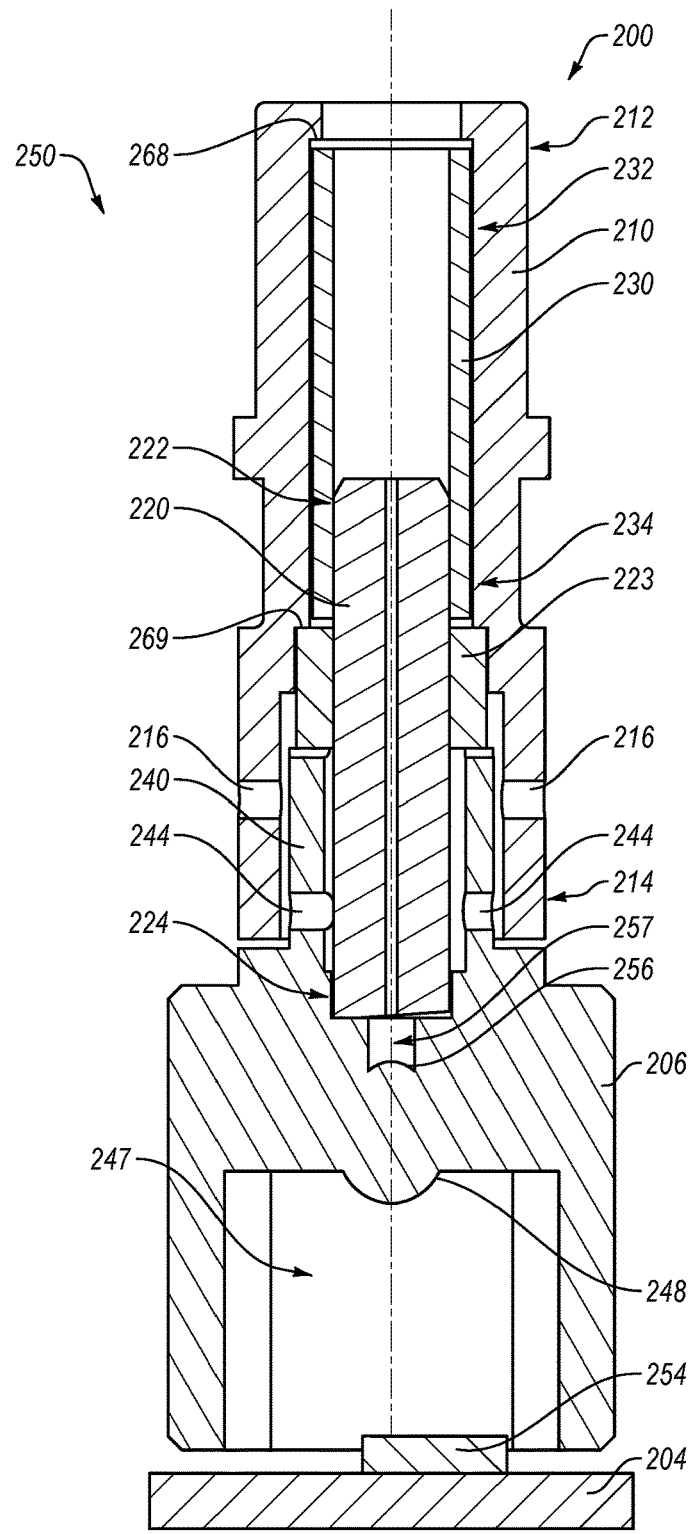
FIG. 2E is another section view of the optoelectronic module of FIG. 2A.

FIG. 2E is another section view of the optoelectronic module 200 further illustrating interior aspects of the optoelectronic module 200. The housing 206 may define a cavity 257 extending along a longitudinal axis of the lens port 240. As shown, the fiber stub 220 may abut the housing 206 at the cavity 257 such that the optical signal 252 may travel between the fiber stub 220 and the optoelectronic component 254. The housing 206 may define an optical component 256 configured to convey, direct, collimate and/or focus the optical signal 252 travelling therethrough. In the illustrated configuration, the optical component 256 includes a lens positioned inside of the cavity 257. As shown, the optical component 256 is optically coupled between the fiber stub 220 and the optoelectronic component 254. The optical component 256 may focus light travelling to between the fiber stub 220 and the optoelectronic component 254.

In some configurations, the optical signal 252 may travel from the optical fiber 202 (see FIG. 2A), through the fiber stub 220, the optical component 156, the optical component 248, and may be received by the optoelectronic component 254. Additionally or alternatively, the optical signal 252 may be generated at the optoelectronic component 254, and may then travel through the optical component 248, the optical component 256 and the fiber stub 220 to the optical fiber 202 (see FIG. 2A).

With continued reference to FIGS. 2A-2E, example aspects of assembling and manufacturing the optoelectronic module 200 will be discussed. In some configurations the housing 206 and the receptacle 210 may be formed of plastic. The housing 206 and/or the receptacle 210 may be formed by any suitable process, such as plastic molding or injection molding.

During assembly of the optoelectronic module 200, the support member 223 may be positioned around the fiber stub 220, and the fiber stub 220 may be positioned opening 242 of the housing 206. In some configurations, the fiber stub 220 may be positioned to the end of the opening 242 such that the second end 224 of the fiber stub 220 at least partially abuts the housing 206 (see, for example, FIG. 2E). The fiber stub 220 and the housing 206 may be secured to one another. For example, an adhesive such as an epoxy may be injected into the openings 244 to secure the fiber stub 220 and the housing 206 with respect to one another.

The first end 222 of the fiber stub 220 may be positioned inside of the opening 236 of the sleeve 130. The sleeve 230 may be positioned around the first end 222 of the fiber stub 220. As illustrated in FIG. 2E, the sleeve 230 may be positioned to abut the support member 223, which in turn abuts the lens port 240 of the housing 206. Accordingly, the sleeve 230, the support member 223, and the housing 106 may partially or fully surround the fiber stub 220 positioned therein.

The housing 206, the fiber stub 220, the support member 223, and the sleeve 230 may be positioned at least partially inside of the opening 218 of the receptacle 210. As illustrated in FIG. 2E, the first opening 218 may include a diameter larger than a corresponding diameter of the second opening 219. The receptacle 210 may include a first narrowed portion 268 and a second narrowed portion 269 between the first opening 218 and the second opening 219. The first opening 218 may be sized and shaped to receive the sleeve 230, and the narrowed portion 268 may prevent the sleeve 230 from being inserted further into the receptacle 210. The narrowed portion 26 may prevent the support member 223 from being inserted further into the receptacle 210 as it supports the fiber stub 220.

In some configurations, the sleeve 230 may be positioned inside of the receptacle 210 and may be retained in the opening 218 between the receptacle 210, the support member 223, and the fiber stub 220. In such configurations, securing the sleeve 230 to the fiber stub 220, the support member 223, and/or the receptacle 210 via an adhesive may not be necessary. Further, in such configurations, the relative position of the receptacle 210, the sleeve 230, the fiber stub 220, the support member 223, and/or the housing 206 may be adjusted to suitably align the components of the optoelectronic module 200. In other configurations, the sleeve 230, the fiber stub 220 and/or the receptacle 210 may be secured to one another via and adhesive such as an epoxy.

Once the components are aligned with respect to one another, the receptacle 210 may be secured to the housing 206. For example, an adhesive such as an epoxy may be injected into the openings 216 to secure the receptacle 210 and the housing 206 with respect to one another. In other configurations, the receptacle 210 and the housing 206 may be coupled to one another by laser welding or ultrasonic welding.

In some aspects, once the housing 206, the receptacle 210, the fiber stub 220, and the sleeve 230 are secured to one another, assembly of the optoelectronic module 200 may be complete, and the connector assembly 250 may be coupled to the optical fiber 202. For example, the optical fiber 202 may be positioned at least partially inside of the opening 219 to be optically coupled with the fiber stub 220. Additionally or alternatively, the optical fiber 202 may be positioned at least partially inside of the opening 219 to be mechanically coupled with the receptacle 210 and/or the sleeve 230.

Aspects described with respect to the optoelectronic module 100 and the optoelectronic module 200 may be implemented for optically and mechanically coupling optoelectronic modules with optical fibers in a manner that reduces optical return loss. For example, the connector assemblies 150, 250 may facilitate optically coupling corresponding optical fibers 102, 202 in a manner that reduces optical return loss. In particular, the connector assemblies 150, 250 may permit the fiber stubs 120, 220 to be positioned against the corresponding optical fibers 102, 202 in a manner that reduces optical return loss. In some configurations, the optoelectronic modules 100, 200 may be implemented to achieve optical connections including an optical return loss of less than 26 decibels (dB).

Additionally or alternatively, aspects of the connector assemblies 150, 250 may result in optical connections with suitable tolerances. In some configurations, aspects of the connector assemblies 150, 250 may be implemented in long wavelength optoelectronic systems to produce optoelectronic modules with suitable tolerances with a relatively low manufacturing costs, even though long wavelength optoelectronic systems generally require tighter tolerances than short wavelength optoelectronic systems. In other configurations, aspects of the connector assemblies 150, 250 may be implemented in short wavelength optoelectronic systems to decrease manufacturing costs, improve tolerances, and/or improve optical coupling.

Since the receptacles 110, 210 and/or the housings 106, 206 may be formed of a plastic material while retaining suitable tolerances for optical connections, the cost of manufacturing the optoelectronic modules 100, 200 may be decreased when compared to traditional optoelectronic modules. In particular, since the receptacles 110, 210 and/or the housings 106, 206 may be formed of a plastic material, relatively more expensive manufacturing techniques such as laser welding may be avoided. In addition, other manufacturing costs associated with metal components may be avoided.

Aspects of the connector assemblies 150, 250 may be relatively less expensive to manufacture than traditional connector assemblies with suitable tolerance and/or that reduce optical return loss. The aspects described may also provide various benefits including the ability to simplify manufacturing processes by simplifying assembly. Furthermore, in some circumstances the concepts described herein may be implemented without modifying the overall size and structure of existing products.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A connector assembly for an optoelectronic assembly comprising:
   a fiber stub including an optically transmissive medium and a channel extending at least partially around a circumference of the fiber stub;
   a sleeve defining a sleeve opening sized and shaped to receive the fiber stub and a corresponding optically transmissive portion of an optical fiber;
   a housing defining a housing cavity at least partially enclosing at least one transmitter or at least one receiver, the housing comprising a lens port defining a lens port opening sized and shaped to receive a portion of the fiber stub;
   a second channel defined between the fiber stub and the lens port, the second channel including a flared configuration to permit the fiber stub to be adjusted in the lens port; and
   a receptacle defining a receptacle opening sized and shaped to receive the lens port, the sleeve and the fiber stub;
   wherein:
      the fiber stub is positioned at least partially in the lens port opening and the sleeve opening; and
      the sleeve and the lens port are positioned at least partially in the receptacle opening.

2. The connector assembly of claim 1, wherein the receptacle is configured to mate with an optical fiber connector of the optical fiber.

3. The connector assembly of claim 1, the housing and the receptacle comprising a plastic material.

4. The connector assembly of claim 3, the receptacle further comprising a material that attenuates EMI or a metal filler that prevents light from passing therethrough.

5. The connector assembly of claim 3, wherein the housing is at least partially transparent between the fiber stub and the transmitter or the receiver.

6. The connector assembly of claim 1, the housing further comprising at least one optical component optically coupled with the transmitter or the receiver.

7. The connector assembly of claim 1, the sleeve comprising a slot extending at least partially between a first end and a second end of the sleeve.

8. The connector assembly of claim 1, further comprising openings extending into an interior of the receptacle, transverse to a longitudinal axis of the receptacle.

9. An optoelectronic assembly comprising:
   at least one transmitter or at least one receiver;
   a sleeve defining a sleeve opening sized and shaped to receive an optically transmissive portion of an optical fiber;
   a housing defining a housing cavity at least partially enclosing the transmitter or the receiver, the housing comprising a lens port defining a lens port opening;
   a fiber stub positioned at least partially in the sleeve opening and the lens port opening, the fiber stub defining a channel extending at least partially around a circumference of the fiber stub;
   a second channel defined between the fiber stub and the lens port, the second channel including a flared configuration to permit the fiber stub to be adjusted in the lens port; and
   a receptacle defining a receptacle opening, wherein the lens port, the sleeve and the fiber stub are positioned at least partially in the receptacle opening.

10. The optoelectronic assembly of claim 9, wherein the receptacle is configured to mate with an optical fiber connector of the optical fiber.

11. The optoelectronic assembly of claim 9, the housing and the receptacle comprising a plastic material.

12. The optoelectronic assembly of claim 11, the receptacle further comprising a material that attenuates EMI or a metal filler that prevents light from passing therethrough.

13. The optoelectronic assembly of claim 11, wherein the housing is at least partially transparent between the fiber stub and the transmitter or the receiver.

14. The optoelectronic assembly of claim 9, the housing further comprising at least one optical component optically coupled with the transmitter or the receiver.

15. The optoelectronic assembly of claim 9, the sleeve comprising a slot extending at least partially between a first end and a second end of the sleeve.

16. The optoelectronic assembly of claim 9, further comprising openings extending into an interior of the receptacle, transverse to a longitudinal axis of the receptacle.

17. The optoelectronic assembly of claim 9, further comprising openings extending into an interior of the lens port, transverse to a longitudinal axis of the lens port.

18. The optoelectronic assembly of claim 9, wherein the fiber stub, the sleeve, the receptacle, and the lens port are arranged concentrically with respect to one another.

19. The optoelectronic assembly of claim 9, further comprising a second channel defined between the lens port and the receptacle, the second channel extending at least partially around a circumference of the lens port.

* * * * *